M. P. CHRISTENSEN
G. W. SLOMIN
INVENTORS

United States Patent Office 2,798,843
Patented July 9, 1957

2,798,843

PLATING AND BRAZING TITANIUM

George W. Slomin, National City, and Mitchell Peter Christensen, San Diego, Calif., assignors to Rohr Aircraft Corporation, Chula Vista, Calif., a corporation of California Application October 29, 1953, Serial No. 389,018

6 Claims. (Cl. 204—32)

This invention relates to the plating on titanium and zirconium and alloys rich in these metals and to the connection of these metals with other metals by a strong joint without the use of rivets, bolts or other similar fasteners.

While titanium and zirconium may be connected to other metals by brazing, by using silver or silver alloy solder to effect the bond, the parts must be subjected to a temperature of about 1400° F. to melt the bonding metal. If the heated parts are exposed to the air, at a temperature much above 700° F. they form surface oxides, nitrides and hydrides which prevent proper brazing so that it is necessary to protect the parts by surrounding them with an inert gas such as helium or argon or a vacuum. The use of a flux is also necessary to dissolve the metal compounds as formed on the surfaces being jointed. A main purpose of the present invention is to provide a method for brazing these metals in which a strong joint may be provided between them without the use of a vacuum or inert gas around the braze.

Another object of the invention is to provide a metallic coating on titanium, zirconium and alloys rich in these metals which protects the metals from having oxide or nitride films formed thereon when the metals are heated to effect the brazing.

A further object is to provide means for quickly cooling the metal in the region which has been brazed so that the main body of the metal does not rise in temperature sufficiently to embrittle it.

A still further object is to provide a method and means for applying such a metallic coating by the use of the electric current which is inexpensive to operate yet produces coatings of uniform composition and great strength which are securely and permanently bonded to the base metal.

Figure 1:
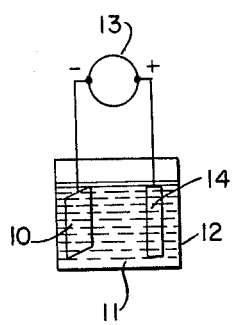
Figure 2:
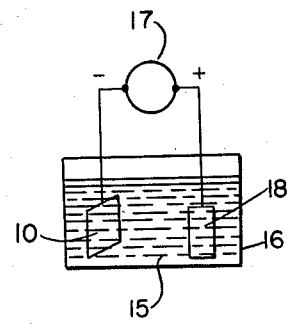
Figure 3:
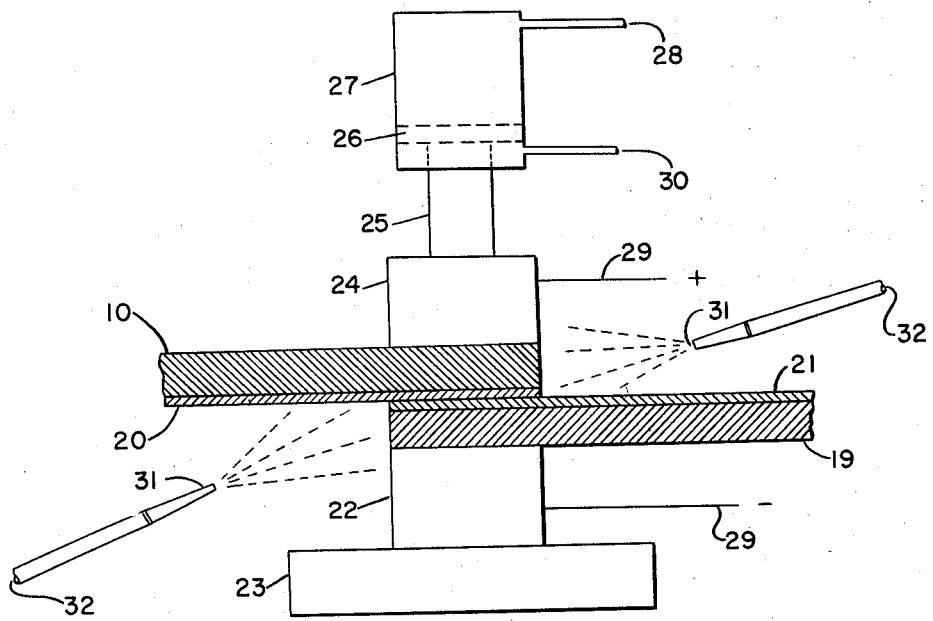

Further objects will become apparent as the description proceeds. For a better understanding of the invention, reference is made to the accompanying drawings in which:

Figs. 1 and 2 are schematic views of apparatus used in practicing the invention; and Fig. 3 is a schematic view, partly in section, of portions of an electric brazing machine with a workpiece in position.

As titanium and zirconium and alloys rich in these metals leave the mill in the form of sheets, rods or bars, they are covered with a thin film of oxides and nitrides of the metal and it has been found that the presence of this film is an important factor in preventing the electroplating of silver and other metals on the base metal. By removing this film it has been found possible to plate other metals on the clean base metal and to use the plated coatings as bonding agents for securely brazing other metals or other pieces of titanium or zirconium thereto.

The removal of the oxide film is effected by immersing the titanium or zirconium workpiece in a bath composed of an aqueous solution of fluoboric acid and hydrofluoric acid. A suitable strength is preferably 45 percent fluoboric acid, $HBF_4$, 5 percent hydrofluoric acid, $HF$, balance water. The bath is preferably kept at a temperature between 60° F. and 105° F. The hydrofluoric acid accelerates the solution of the oxide film and in a short time the workpiece is ready for plating.

The workpiece 10 is removed from the bath and while wet, immediately immersed in a plating bath 11 (Fig. 1) contained in a vessel 12. It is then connected as a cathode in an electric circuit supplied with direct current by a generator 13, an anode 14 of suitable metal being connected to the positive terminal of the generator. The plating bath is an aqueous solution of the fluoborate of a metal of the group comprising silver, copper, gold, nickel, zinc, cadmium or iron and fluoboric acid. The concentrated fluoborate of the metal is diluted with water to an extent depending on how smooth a surface is desired on the plating. The presence of fluoboric acid in the solution prevents an oxide film from forming on the base metal. Different metals require different current densities during plating, these ranging from 25 to 150 amperes per square foot of cathode surface. If only a part of the workpiece needs to be plated as, for example, one end thereof, only the portion to be plated is immersed in the plating bath. Other metals may be plated by the method above described. For example, aluminum or stainless steel of any type may be plated with silver or copper and may then be brazed to titanium or zirconium workpieces plated with the same metal in a manner to be later described. Stainless steels of Types 310, 321 and 347 may be silver plated in the usual manner, using a current density high enough to give a porous plating and then firmly secured to silver plated titanium or zirconium by brazing. These steels have the following approximate compositions in percentage by weight:

|  | Type 310 | Type 321 | Type 347 |
|---|---|---|---|
| Chromium | 25 | 18 | 18 |
| Nickel | 20 | 9 | 10 |
| Manganese | 2 | 2 | 2 |
| Silicon | 1.5 | 1 | 1 |
| Iron and Minor Impurities | 51.5 | 70 | 69 |

In another method for plating silver on titanium or zirconium, the immersion in fluoboric acid above described is omitted and the workpiece is immersed in bath 11 for a few seconds to be cleaned before the current is applied. The current is then applied only long enough to deposit a silver strike plating thick enough to protect the surface against oxidation. In this case bath 11 is an aqueous solution of silver fluoborate and 10 percent of a suitable surface tension depressant, preferably ethyl alcohol, the silver content being about 20 percent. The bath is made by diluting a 47 percent silver fluoborate concentrate with distilled water and adding the alcohol. The current density during the strike plating is preferably kept at a value between 20 and 25 amperes per square foot of cathode. After the silver strike is deposited, the workpiece is removed from bath 11, washed with water and at once immersed in a bath 15 contained in a vessel 16 (Fig. 2). The workpiece is connected to the negative terminal of direct current generator 17, the positive terminal being connected to a silver anode 18. Bath 15 is an aqueous solution of silver cyanide of a concentration usually used in silver plating. If the workpiece is to be brazed to another similarly plated metal member, the plating is discontinued before the thickness of the silver film reaches .003 inch, the workpiece removed from the bath, washed with water and allowed to dry. The thickness depends on the surface roughness of the base metal and should be no greater than required to form a strong bond between the members to be brazed together as, for example, .002 inch. In both methods of plating, the plating has microscopic pores which permit flux to permeate the plating and contact the titanium thereby keeping it free of oxide film which tends to form when the metal is heated for brazing in the manner described below.

Fig. 3 illustrates schematically a press for brazing a titanium or zirconium workpiece 10 to a stainless steel member 19, workpiece 10 having a silver coating 20 and member 19 a silver coating 21 applied by either of the methods above described, the thickness of the coatings being much exaggerated for clarity. Just before being placed in the press, a liquid fluoride flux is painted on the silver coatings. The end of member 19 rests on a copper electrode 22 which is supported on a stationary base 23. An upper copper electrode 24 is connected to a piston rod 25 attached to piston 26 slidable in a cylinder 27, the piston being forced down by compressed air supplied to the cylinder above the piston by a pipe 28. Simultaneously with the application of pressure, heating current is supplied to electrodes 22, 24 by a pair of cables 29 whose ends are connected to a suitable source of electrical current (not shown). The current is sufficient to melt the silver of coatings 20 and 21 in the region of contact in a short time whereupon the current may be discontinued or the pressure relieved by raising electrode 24 by admitting compressed air under piston 26 from a pipe 30. Air under suitable pressure is supplied to pipes 28 and 30 by a source (not shown). As soon as the molten metal hardens it forms a bond of great strength between the members 10 and 19.

It has been found that if the heat from the brazing area is allowed to travel along titanium or zirconium workpiece 10 by conduction for an appreciable time, it causes the base metal to become very brittle and impairs its use as a structural member. To prevent this rise in temperature and to keep the heat concentrated at the region of brazing, a coolant liquid is directed in the form of a fine spray or fog against members 10 and 19 around the region of braze. Such a spray is illustrated as being supplied by a pair of spray nozzles 31 to which coolant liquid is supplied by pipes 32. The spray is turned on before the electrical current commences to flow so that it is available to keep the base metals from increasing much in temperature around the region of braze and also after the contacting silver coatings have fused together and the flow of current has ceased. The quick fusion of the plated coatings under suitable pressure while maintaining the main body portions of the workpieces at a low temperature assures a strong brazed joint without changing the physical properties of the workpieces.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. The method of coating a workpiece composed of a metal of the group consisting of titanium and zirconium, said metal being covered with a thin film of its oxide, which comprises the steps of immersing the workpiece in an aqueous solution of fluoboric and hydrofluoric acids to dissolve the oxide film; removing the workpiece from the solution, while the workpiece is still wet immersing it in a solution consisting of water, fluoboric acid and silver fluoborate; and passing electric current through the solution in a direction to deposit the silver thereof on the workpiece.

2. The method of coating a workpiece composed of a metal of the group consisting of titanium and zirconium with a thin, adherent smooth deposit of silver which comprises cleaning the workpiece to remove substantially all of the surface oxide film and electrodepositing on the clean metal of the workpiece a thin deposit of silver, said electrodeposition occurring from an electroplating solution consisting of water, fluoboric acid and silver fluoborate with a direct plating current having a density from 25 to 150 amperes per square foot of workpiece.

3. The method of coating a workpiece composed of a metal of the group consisting of titanium and zirconium with an adherent deposit of silver which comprises cleaning the workpiece to remove all of the surface oxide film; electrodepositing on the clean workpiece a thin deposit of silver, said electrodeposition occurring from an aqueous electroplating solution containing silver fluoborate and substantially 10 percent alcohol, the silver content being about 20 percent; washing the plated workpiece with water; and immediately thereafter electrodepositing on the silver plating a second plating substantially thicker than the first plating, said second electrodeposition occurring from an aqueous bath containing silver cyanide.

4. The method of coating a titanium workpiece with a thin adherent strike plating of silver which comprises; immersing the workpiece in an aqueous solution composed of water, silver fluoborate and ethyl alcohol, the silver content being about 20 percent and the alcohol content being about 10 percent; and soon thereafter while the workpiece remains immersed passing electric current through said solution in such direction that the workpiece constitutes a cathode.

5. An electroplating bath for depositing a metallic silver strike on the surface of a metal of the group consisting of titanium and zirconium which consists of an aqueous solution of silver fluoborate, the silver content on the solution weight basis being about 20 percent; and containing an addition of ethyl alcohol in amount sufficient to lower the surface tension of the bath to 37 dynes per square centimeter or lower.

6. The method of coating a workpiece composed of a metal of the group consisting of titanium and zirconium and whose surface is free of metallic oxides which comprises immersing the workpiece in a solution consisting of water, fluoboric acid and silver fluoborate; and passing electric current at a density of from 25 to 150 amperes per square foot of workpiece surface through the solution to deposit a thin silver strike on the surface of the workpiece.

References Cited in the file of this patent

UNITED STATES PATENTS

| | | |
|---|---|---|
| 630,246 | Loeb | Aug. 1, 1899 |
| 2,001,385 | Gronningsaeter | May 14, 1935 |
| 2,330,943 | Anderson | Oct. 5, 1943 |
| 2,415,724 | Beall | Feb. 11, 1947 |
| 2,653,211 | Andrus | Sept. 22, 1953 |
| 2,711,389 | Beach | June 21, 1955 |
| 2,746,316 | Richaud | May 22, 1956 |

OTHER REFERENCES

Handbook on Titanium Metal, 7th edition, Titanium Metals Corporation of America, August 1, 1953, page 92.

The Electrochemical Society Preprint 59–33, released April 27, 1931. "Electrodeposition of Silver From Sulfate, Nitrate, Fluoborate and Fluoride Solutions," pp. 371–376.

Corrosion, vol. 10, No. 4, April 1954, page 60. Abstract of a report dated January 31, 1952.

Materials and Methods, June 1952, pages 119, 120 and 130; October 1953, pages 107–9.

Journal of Metals, June 1952, pages 609 and 610.

Metallic Titanium and its Alloys, Bureau of Mines, I. C. 7381, November 1, 1946, pages 11–19.

A Special American Machinist Report to the Metal Working Industries, June 11, 1951, page 153.